United States Patent
Jehle et al.

(10) Patent No.: US 7,377,260 B2
(45) Date of Patent: May 27, 2008

(54) METHOD AND DEVICE FOR CONTROLLING AN INTERNAL COMBUSTION ENGINE

(75) Inventors: Martin Jehle, Regensburg (DE); Dirk Schneider, Pfaffenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 23 days.

(21) Appl. No.: 11/579,424

(22) PCT Filed: Feb. 16, 2005

(86) PCT No.: PCT/EP2005/050688

§ 371 (c)(1),
(2), (4) Date: Nov. 2, 2006

(87) PCT Pub. No.: WO2005/111410

PCT Pub. Date: Nov. 24, 2005

(65) Prior Publication Data

US 2007/0250252 A1    Oct. 25, 2007

(30) Foreign Application Priority Data

May 7, 2004    (DE) .................. 10 2004 022 593

(51) Int. Cl.
*F02P 5/15*    (2006.01)
*F02D 41/14*    (2006.01)

(52) U.S. Cl. .................. 123/406.2; 123/406.23; 123/406.45; 123/436; 701/110

(58) Field of Classification Search ........... 123/406.2, 123/406.23–406.25, 406.41–406.43, 406.45, 123/435, 436; 701/110, 111
See application file for complete search history.

(56) References Cited

U.S. PATENT DOCUMENTS

2004/0069272 A1    4/2004    Allen et al.

FOREIGN PATENT DOCUMENTS

| DE | 39 04 832 A1 | 8/1990 |
|----|---|---|
| DE | 199 09 658 A1 | 9/2000 |
| DE | 103 19 289 A1 | 12/2003 |
| DE | 103 22 509 A1 | 12/2003 |
| DE | 103 22 510 A1 | 12/2003 |
| DE | 103 22 961 A1 | 12/2003 |
| DE | 103 32 825 A1 | 3/2004 |
| DE | 103 40 439 A1 | 4/2004 |
| EP | 1 074 717 A2 | 2/2001 |
| EP | 1 258 619 A2 | 11/2002 |
| EP | 1 270 915 A2 | 1/2003 |
| EP | 1 323 902 A2 | 7/2003 |
| JP | 9-88786 | * 3/1997 |

* cited by examiner

Primary Examiner—T. M Argenbright

(57) ABSTRACT

An internal combustion engine has a plurality of cylinders having combustion chambers and each being associated with a spark plug designed for igniting a mixture of air and fuel in the combustion chamber, and at least two adjusting devices for adjusting the air supply to the combustion chambers of the different cylinders. To control the internal combustion engine, an individual ignition angle is detected for each group of cylinders to which the same air mass per working cycle is respectively supplied and during the respective working cycles of which the same loss torque is decisive. The decisive loss torque is the one associated with the cylinder that is in its intake cycle during the respective working cycle of the respective cylinder of the respective group. The individual ignition angle for each group is detected as a function of the decisive loss torque for the respective group.

13 Claims, 4 Drawing Sheets

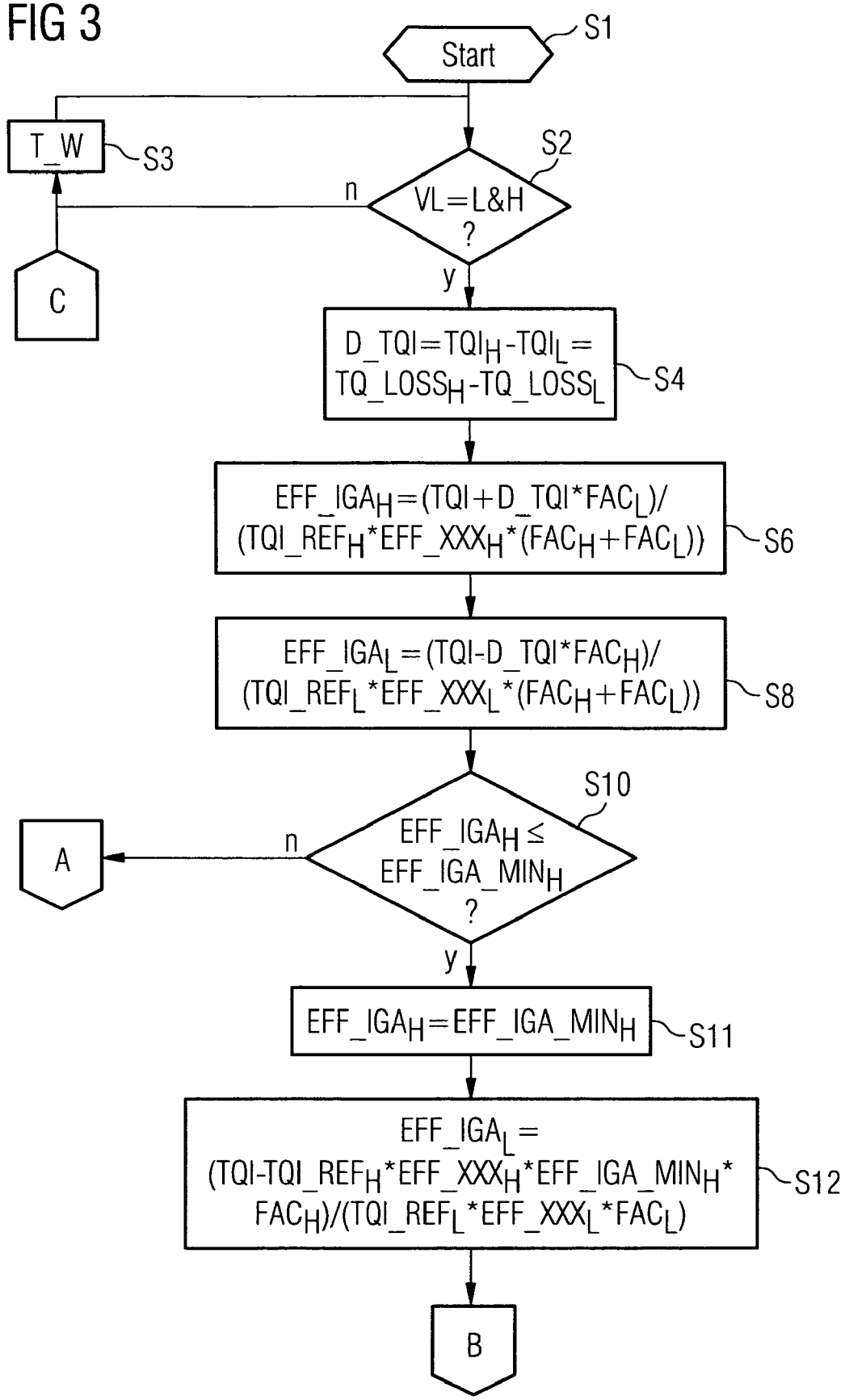

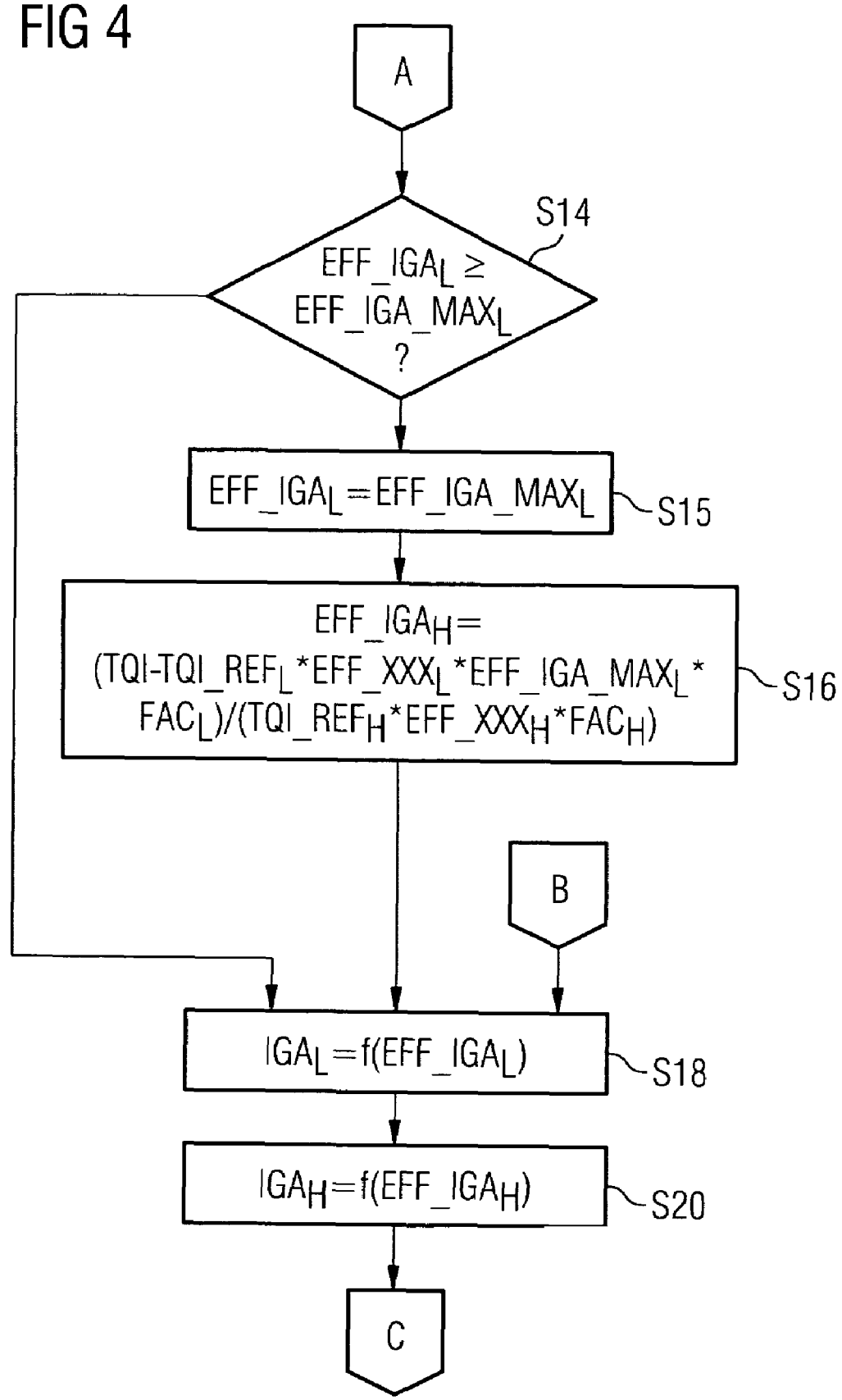

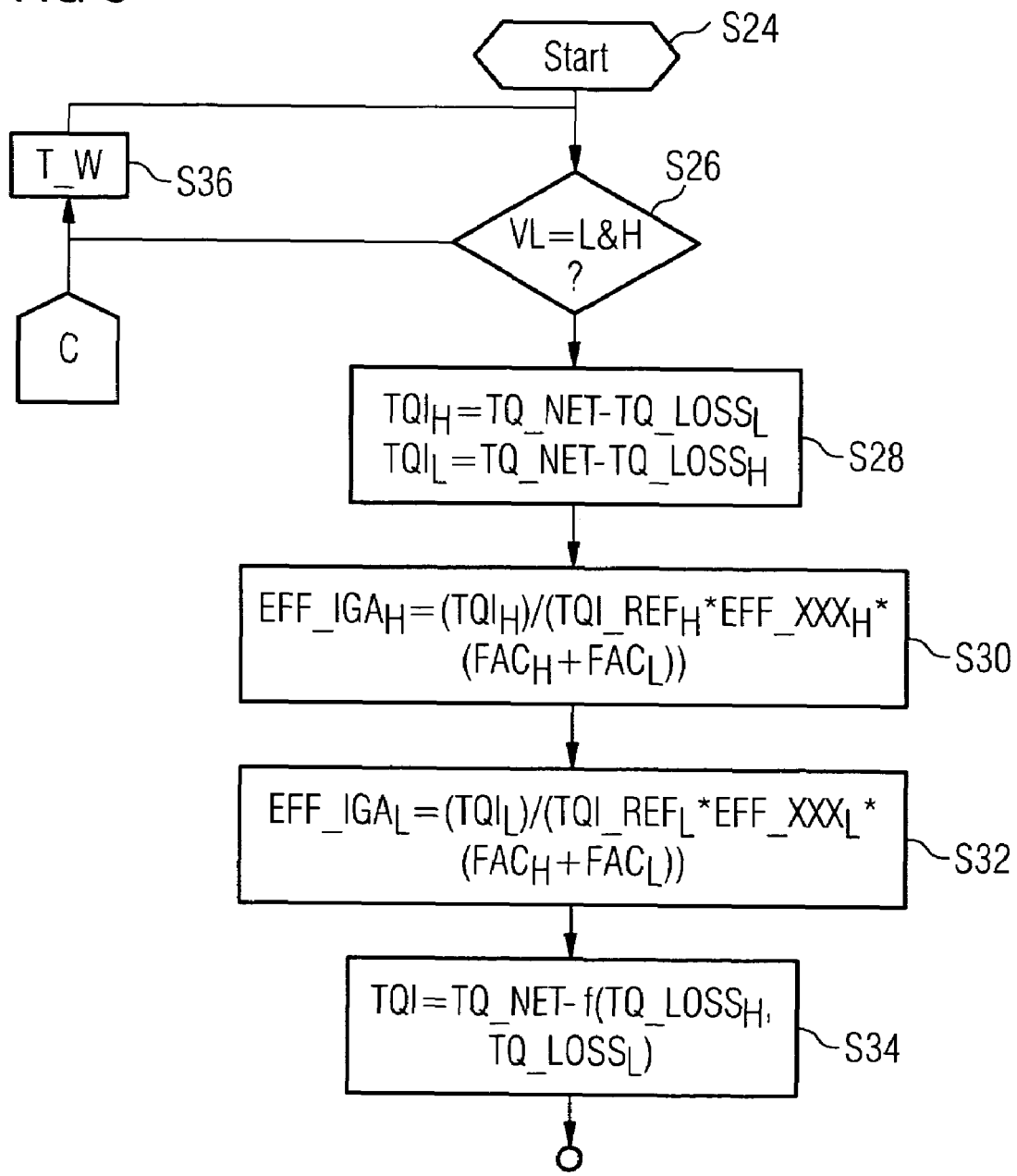

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2005/050688, filed Feb. 16, 2005 and claims the benefits of German Patent application No. 10 2004 022 593.1 filed May 7, 2004. All of the applications are incorporated by reference herein in their entirety.

FIELD OF INVENTION

The invention relates to a method and a device for controlling an internal combustion engine.

BACKGROUND OF THE INVENTION

Increasingly high demands are being placed on internal combustion engines with regard to their performance and efficiency. At the same time, because of strict legal regulations, emissions must also be low. Such demands can readily be met if the internal combustion engine is fitted with gas-changing valves and corresponding actuators for said valves, in which the valve lift characteristic varies depending on the working point of the internal combustion engine. By this means, throttle losses upon intake of air can be reduced and high exhaust gas recirculation rates rapidly adjusted, where applicable.

It is known for the valve lift of a gas intake valve of the internal combustion engine to be adjusted between a low and a high valve lift. Thus, for example, the Porsche 911 Turbo is fitted with a device for adjusting the valve lift of the gas intake valve and of the gas outlet valve. The internal combustion engine of this vehicle is also equipped with a camshaft on which for each gas intake valve one cam with a low lift and two further cams with a higher lift are fashioned. The cam lift is transferred by means of a transfer unit to the gas intake valve. The transfer unit is fashioned as a cup tappet which comprises a cylinder element and an annular cylinder element arranged concentrically in relation to said cylinder element. The cam having a low lift acts upon the cylinder element while the cams having the higher lift act upon the annular cylinder element. Depending on a switching position of the cup tappet, either the low lift or the higher lift is transferred to the gas intake valve. When the internal combustion engine is idling, the low cam lift is transferred to the gas intake valve. Reduced frictional losses are produced by this means due to the small diameter of the cam used in this operating state and to the cylinder element and to the lower valve lift.

A higher load movement is also achieved. In this way, the emissions of the internal combustion engine can be reduced and fuel consumption kept low at the same time. The small valve lift is retained for low and moderate loads. Throttle losses can additionally be reduced by means of an appropriate phase adjustment between the gas intake valve and the gas exhaust valve and a resulting internal exhaust gas recirculation rate. When the load demands on the internal combustion engine are high, it switches over to the higher valve lift.

For a high level of driving comfort in a vehicle in which an internal combustion engine of this type is arranged, it is important to ensure that running irregularities in the internal combustion engine are low. This is a major challenge particularly at working points at which some of the gas intake valves are being operated with a high valve lift and others with a low valve lift.

From EP 1 323 902 A2 a method for controlling an internal combustion engine is known which comprises a variable valve timing control device for the gas intake valves. A target opening timing for a gas intake valve is determined. An actual opening timing for the gas intake valve is also determined. An ignition angle is corrected depending on a deviation between the target value and the actual value for the opening timing of the gas intake valve.

SUMMARY OF INVENTION

The object of the invention is to create a method and a device for controlling an internal combustion engine which enable the internal combustion engine to run with limited irregularities.

This object is achieved in the features of the independent claims. Advantageous embodiments of the invention are characterized in the subclaims.

The invention is distinguished by a method and a corresponding device for controlling an internal combustion engine comprising a plurality of cylinders having combustion chambers and each being associated with a spark plug designed for igniting a mixture of air and fuel in the combustion chamber, and comprising at least two adjusting devices for adjusting the air supply to the combustion chambers of different cylinders. An individual ignition angle is determined respectively for each of at least two groups of cylinders to which the same air mass per working cycle is respectively to be supplied and during the respective working cycles of which the same loss torque is decisive. The decisive loss torque is the one associated with the respective cylinder that is in its intake cycle during the respective working cycle of the respective cylinder of the respective group. The individual ignition angle for each group is determined as a function of the decisive loss torque for the respective group.

The invention is based upon the recognition that where an equal actual torque of each group of cylinders is desired, the respective indicated torques of the respective groups of cylinders may differ only by the loss torques associated with them. It also utilizes the recognition that it is precisely that cylinder that is in its intake cycle which decisively influences the loss torque within the crankshaft angle range, while a different cylinder is in its working cycle.

Torque equalization is thus possible in a simple manner through a simple adaptation of the respective individual ignition angle for the group as a function of the decisive loss torque for the respective group and in this way a very limited irregularity of running of the internal combustion engine can be ensured.

An indicated torque is respectively the torque which is generated through the combustion of the air/fuel mixture present in the respective cylinder without taking into account losses such as occur, for example as a result of friction or pumping work. The actual torque, on the other hand, is the torque which then takes these losses into account. The actual torque is consequently the torque which is output on the coupling side of the crankshaft of the internal combustion engine or at a further point down to a wheel of a vehicle in which the internal combustion engine is arranged.

In an advantageous embodiment of the invention, the individual ignition angle is determined for each group as a function of a difference between the decisive loss torque for the respective group and the decisive loss torque for another group. In this way, very good equalization of the torques of the cylinders can be effected in a simple manner if, depending on the desire of the driver, the indicated torque is determined with no distinction being made between the different loss torques for the respective groups but a mean loss torque effective per working cycle of the internal combustion engine being taken as the basis.

According to a further advantageous embodiment of the invention, the individual ignition angle is limited to a minimum and/or to a maximum ignition angle. In this way, if the minimum and maximum ignition angle are chosen suitably, the occurrence of knocking or ignition failures or inadmissibly high exhaust gas temperatures can be prevented in a simple manner.

According to a further advantageous embodiment of the invention, when an individual ignition angle which is associated with a group reaches the minimum ignition angle, another individual ignition angle which is associated with another group is determined as a function of the minimum ignition angle. Ignition failures and inadmissibly high exhaust gas temperatures can in this way reliably be prevented and also, as far as possible, the desired torque set for low running irregularity.

According to a further advantageous embodiment of the invention, when a cylinder-specific ignition angle which is associated with a group of cylinders reaches the maximum ignition angle, another individual ignition angle which is associated with another group of cylinders is determined as a function of the maximum ignition angle. Knocking can reliably be prevented in this way and also, as far as possible, the desired torque set for low running irregularity.

BRIEF DESCRIPTION OF THE DRAWINGS

Exemplary embodiments of the invention are explained below with the aid of the schematic drawings, in which:

FIG. 5 shows a further program for controlling the internal combustion engine, which program is executed in the control unit.

Elements having the same design or function are labeled with the same reference characters.

DETAILED DESCRIPTION OF INVENTION

Figure 1:
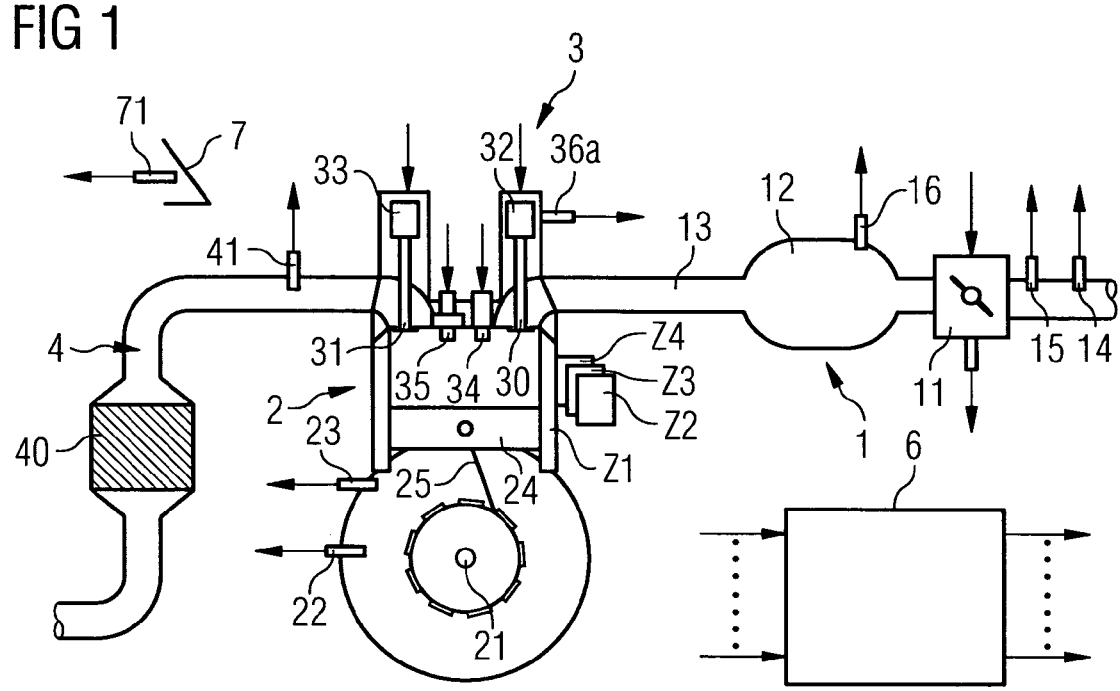
FIG. 1: shows an internal combustion engine having a control unit.

An internal combustion engine (FIG. 1) comprises an intake manifold 1, an engine block 2, a cylinder head 3 and an exhaust manifold 4. The intake manifold preferably comprises a throttle valve 11, and also an accumulator 12 and a suction pipe 13 which is guided to a cylinder Z1 via an inlet channel into the engine block 2. The engine block 2 also comprises a crankshaft 21 which is connected via a connecting rod 25 to the piston 24 of the cylinder Z1.

Figure 2:
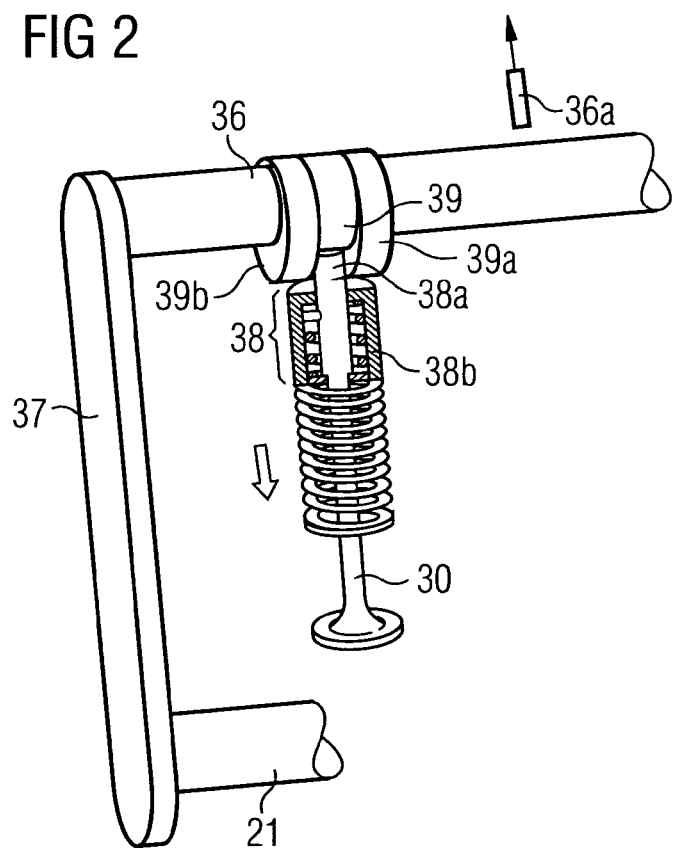
FIG. 2: shows a further view of parts of the internal combustion engine according to FIG. 1, FIG. 3 and FIG. 4 show a program for controlling the internal combustion engine, which program is executed in the control unit

The cylinder head 3 comprises a valve drive having a gas intake valve 30, a gas outlet valve 31 and valve actuators 32, 33. The gas intake valve 30 and the gas outlet valve 31 are actuated by means of a camshaft 36 (FIG. 2) on which cams 39, 39a and 39b are fashioned, which cams act upon the gas intake valve 30. Cams that are not shown are also provided, optionally on a further camshaft, which cams act upon the gas outlet valve 31.

A total of three cams 39, 39a, 39b (FIG. 2) are associated with the gas intake valve. The cams 39, 39a, 39b act via a transfer unit 38 upon the gas intake valve 30. The transfer unit 38 is fashioned as a cup tappet. It comprises a cylinder element 38a and an annular cylinder element 38b arranged concentrically in relation thereto. The cam 39 acts upon the cylinder element 38a. The cams 39a, 39b act upon the annular cylinder element 38b. In one switching position of the cup tappet, only the lift of the cam 39, which is less than that of the cams 39a and 39b, is transferred to the gas intake valve 30. In this switching position, the gas intake valve 30 is operated with a small valve lift L. In a further switching position of the cup tappet, the lifts of the cams 39a and 39b are transferred to the gas intake valve 30. In the further switching position of the cup tappet, the gas intake valve 30 is operated with a high valve lift L. The switching position of the cup tappet can be achieved through a corresponding triggering of an actuator provided in the cup tappet and is preferably effected hydraulically.

The valve actuator 32, 33 can, however, also be fashioned in an alternative manner. For example, the cam shaft can be fashioned and can interact with an actuator such that different cams act upon the gas intake valve depending upon the valve lift desired.

The cylinder head 3 (FIG. 1) also comprises an injection valve 34 and a spark plug 35. Alternatively, the injection valve can also be arranged in the suction pipe 13.

The exhaust manifold 4 comprises a catalytic converter 40. From the exhaust manifold 4 an exhaust gas recirculation line can be guided to the intake manifold 1, in particular to the accumulator 12.

Also provided is a control unit 6 with which sensors are associated that record various measured variables and respectively determine the measured value of the measured variable. The control unit 6 determines as a function of at least one of the measured variables manipulated variables which are then converted into one or more actuating signals for controlling the final control elements by means of corresponding actuators.

The sensors are a pedal position sensor 71 which records the position of an accelerator pedal 7, an air-mass meter 14 which records an air-mass flow upstream of the throttle valve 11, a temperature sensor 15 which records the intake air temperature, a pressure sensor 16 which records the suction pipe pressure, a crankshaft angle sensor 22 which records a crankshaft angle with which a rotational speed N is then associated, a further temperature sensor 23 which records a coolant temperature, a camshaft angle sensor 36a which records the camshaft angle and an oxygen probe 41 which records a residual oxygen content of the exhaust gas and optionally a sensor which records whether the gas intake valve 30 is being operated with a low or a high valve lift L, H. Depending on the embodiment of the invention, any subset of the sensors mentioned or even additional sensors may be present.

The final control elements are, for example, the throttle valve 11, the gas intake and gas outlet valves 30, 31, the injection valve 34, the spark plug 35, the adjusting mechanism 37 or the transfer unit 38.

The internal combustion engine also has, in addition to the cylinder Z1, further cylinders Z2, Z3, Z4 with which corresponding sensors and final control elements are associated and which are controlled accordingly. The final control elements are fashioned such that simultaneously some of the gas intake valves can be operated with a low valve lift L and some others with a high valve lift H. The final control elements can optionally also be fashioned such that the gas intake valves can also be operated with further valve lifts VL. Furthermore, final control elements such as, for example, pulsed load valves, can alternatively or additionally be provided which can influence the air supply optionally cylinder-specifically.

The final control elements which influence the air supply to single or a plurality of cylinders are also called adjusting devices for adjusting the air supply to the respective combustion chambers of the respective cylinders.

The control unit 6 corresponds to a device for controlling the internal combustion engine.

If in an internal combustion engine final control elements which influence the air supply to the respective cylinder Z1 to Z4 are actuated differently and if as a consequence thereof there are significantly different air masses in different cylinders during a working cycle of the internal combustion engine, groups of cylinders can be formed to which the same air mass per working cycle is supplied respectively and during the respective cylinder segments of which the same loss torque is decisive. An actual torque TQ which is generated by each one of the groups must be equal to a net value TQ_NET of the actual torque TQ, and this must be the case for all the groups. This is represented below with the aid of the following formula:

$$TQ_x = TQ\_NET; \ x = 1 \ldots m \quad (F1)$$

m designates the number of groups, x is a counter for the respective group. The actual torque TQ, the net value TQ_NET and all the other torques which are also inserted below, refer respectively to that torque which would be generated if all the cylinders were to generate such a torque during a working cycle.

The actual torque TQ of each group of cylinders is given by the following relationship $$TQ_x = TQI_x + TQ\_LOSS; \ x = 1 \ldots m, \ z = 1 \ldots n \quad (F2)$$

TQI designates respectively an indicated torque and TQ_LOSS a loss torque. The loss torque TQ_LOSS depends decisively on the respective rotational speed, the respective air mass flow in the respective cylinder Z1 to Z4, the coolant temperature and/or an oil temperature. The loss torque TQ_LOSS is defined as a negative value. n designates the different discrete switching positions which can result in correspondingly many simultaneous different air masses in the respective cylinders Z1 to Z4. z is an index which is associated with the loss torque TQ_LOSS.

If the formula (F2) is solved with respect to the indicated torque TQI, then the following formula is produced $$TQI_x = TQ_x - TQ\_LOSS_z \quad (F3)$$

If the formula (F1) is then inserted in (F3), then this gives:

$$TQI_x = TQ\_NET - TQ\_LOSS_z \quad (F4)$$

The following formula can also be applied for the respective indicated torque $TQI_Y$ of the respective group of cylinders $$TQI_x = TQI\_REF_y * EFF\_IGA_x * EFF\_XXX_x; \ y = 1 \ldots n, \quad (F5)$$

TQI_REF designates a reference torque which is produced as an indicated torque if a predetermined ignition angle and further parameters influencing the torque are set to predetermined values which are chosen, for example, such that under corresponding limiting conditions a maximum indicated torque is then produced. y is an index which is associated with the reference torque TQI_REF.

EFF_IGA designates an ignition angle efficiency which is related respectively to the ignition angle of the reference torque TQI_REF. EFF_XXX designates a miscellaneous efficiency and consequently combines all further parameters by means of which the reference torque TQI_REF can be changed such that the indicated torque TQI is produced. The miscellaneous efficiency EFF_XXX takes into account in particular an enriching or weakening of the air/fuel mixture located in the respective cylinder on the basis of the output signal of a lambda control.

A program is described below which is stored in the control unit 6 and is executed in the control unit 6 during operation of the internal combustion engine. This program will be described by way of example for cases in which the valve lift VL of the gas intake valves 30 has either a low valve lift L or a high valve lift H and the valve lift VL of the respective gas intake valves 30 can be individually adjusted for each cylinder singly or else only groupwise.

The program is started in a step S1 (FIG. 3) which is carried out as promptly as possible after the internal combustion engine has started up and in which variables are optionally initialized.

In a step S2, a check is made as to whether the valve lifts VL of individual gas intake valves 30 correspond to the low valve lift L and the valve lifts of other gas intake valves 30 simultaneously correspond to the high valve lift H. If this is not the case, then preferably only a single ignition angle is determined for all the cylinders Z1 to Z4 and the program then proceeds in a step S3 for a predetermined waiting period before the condition of step S2 is checked again.

If on the other hand the condition of step S2 is fulfilled, then in a step S4 an indicated differential torque D_TQI is determined, that is depending on the difference between an indicated torque $TQI_H$ when the valve lift H is high and an indicated torque $TQI_L$ when the valve lift L is low. Applying the formula (F4) correspondingly, the indicated torque $TQI_H$ when the valve lift H is high is equal to the difference between the net value TQ_NET of the actual torque TQ and the loss torque $TQ\_LOSS_L$ when the valve lift L is low. This is valid for cases in which, during the respective working cycle of the respective cylinder which is being operated with a high valve lift H, a cylinder which is being operated with a low valve lift L is currently in its intake cycle.

Applying the formula (F4) correspondingly, the indicated torque $TQI_L$ when the valve lift L is low is equal to the difference between the net value TQ_NET of the actual torque TQ and the loss torque $TQ\_LOSS_H$ when the valve lift H is high. This is valid for cases in which, during the respective working cycle of the respective cylinder which is being operated with a low valve lift L, a cylinder which is being operated with a high valve lift H is currently in its intake cycle.

The indicated torque D_TQI is equal to the difference between the loss torque $TQ\_LOSS_H$ when the valve lift H is high and the loss torque $TQ\_LOSS_L$ when the valve lift L is low. The loss torques $TQ\_LOSS_H$ and $TQ\_LOSS_L$ can be determined for example as a function of the engine speed, the respective air mass flow in the respective cylinder Z1 to Z4, the coolant temperature and/or the oil temperature.

In a step S6, an ignition angle efficiency $EFF\_IGA_H$ is then determined for the cylinders whose valve lift VL has a high valve lift H. This is carried out depending on the relationship specified in step S6. $FAC_L$ designates a torque factor which represents the ratio of fired cylinders of the group of cylinders Z1-Z4 which are being operated with a low valve lift L to the total number of cylinders Z1-Z4 of the internal combustion engine. Correspondingly, $FAC_H$ designates a torque factor which represents the ratio of fired cylinders of the group of cylinders Z1-Z4 which are being operated with a high valve lift H to the total number of cylinders Z1-Z4. $TQI\_REF_H$ is the reference torque when all the cylinders Z1-Z4 are being-operated at the given working point with a high valve lift H. $EFF\_XXX_H$ is the correspondingly associated miscellaneous efficiency. The indicated torque TQI is determined according to the desire of the driver, which is expressed for example by the position of the accelerator pedal, and taking further torque requirements into account, by a different function of the control unit.

In a step S8, an ignition angle efficiency $EFF\_IGA_L$ is determined for the cylinders Z1-Z4 which are being operated with a low valve lift L. This is carried out in accordance with the relationship specified in step S8. $TQI\_REF_L$ designates a reference torque when the valve lift is low and $EFF\_XXX_L$ a miscellaneous efficiency associated with this reference torque.

It can then be ensured in a simple manner by means of the determined ignition angle efficiencies $EFF\_IGA_H$ and $EFF\_IGA_L$ that the torque TQ actually generated per working cycle is subject only to extremely small fluctuations and consequently that a very good level of irregularity of running of the internal combustion engine is ensured.

In a step S10, a check is then made as to whether the ignition angle efficiency $EFF\_IGA_H$ for the group of cylinders Z1 to Z4 with a high valve lift H is less than or equal to a minimum ignition angle efficiency $EFF\_IGA\_MIN_H$. If the condition of step S10 is not fulfilled, then processing is continued in a step S14 which is explained in detail further below.

If, on the other hand, the condition of step S10 is fulfilled, then in a step S11, the ignition angle efficiency $EFF\_IGA_H$ for the group of cylinders with a high valve lift H is set equal to the minimum ignition angle efficiency $EFF\_IGA\_MIN_H$, and this is done in a step S11.

Then, in a step S12, the ignition angle efficiency $EFF\_IGA_L$ is determined for the group of cylinders which are being operated with a low valve lift L, according to the relationship specified in step S12.

Following step S12, processing is continued in step S18.

In a step S14, a check is made as to whether the ignition angle efficiency $EFF\_IGA_L$ for the group of cylinders Z1 to Z4 with a low valve lift L is greater than or equal to a maximum ignition angle efficiency $EFF\_IGA\_MAX_L$. If this is not the case, then processing is continued in step S18. If, on the other hand, the condition of step S14 is fulfilled, then in a step S15, the maximum ignition angle efficiency $EFF\_IGA\_MAX_L$ is associated with the ignition angle efficiency $EFF\_IGA_L$.

In a subsequent step S16, the ignition angle efficiency $EFF\_IGA_H$ is then determined, depending on the relationship specified in step S16.

By means of the procedure according to steps S11 and S12 or steps S15 and S16, it can be ensured that even if the conditions of steps S10 or S14 are fulfilled, as low a running irregularity of the internal combustion engine as possible is ensured without knocking or ignition failures arising, the desired torque being set as accurately as possible.

In a step S18, an individual ignition angle $IGA_L$ is determined for those cylinders Z1 to Z4 which are being operated with a low valve lift L. This is effected as a function of the ignition angle efficiency $EFF\_IGA_L$. For example, this can also be effected by means of an engine characteristics map or through another predeterminable relationship.

In a subsequent step S20, an ignition angle $IGA_H$ is then determined for the group of cylinders Z1 to Z4 which are being operated with a high valve lift H. This is effected as a function of the ignition angle efficiency $EFF\_IGA_H$. This can also be effected, as in step S18, through the interpolation of an engine characteristics map or else by means of another relationship. The ignition angles $IGA_L$ and $IGA_H$ determined in steps S18 and S20 are then subsequently adjusted accordingly in the respective cylinders Z1 to Z4 through corresponding actuation of the respective spark plugs 35. Following the processing of step S20, the processing of the program is continued in step S3.

It is also possible in steps S6, S8, S11, S12, S15, S16 to determines corresponding ignition angles directly and to make the conditions of steps S10 and S14 dependent on corresponding ignition angles. Steps S18 and S20 can then be omitted.

A further embodiment of the program shown in FIGS. 3 and 4 is explained below with reference to FIG. 5. The program is started in a step S24 that corresponds to step S1. Steps S26 and S36 correspond to steps S2 and S3.

In a step S28, the indicated torque $TGI_H$ when the valve lift is high is determined by establishing the difference between the net value $TQ_{NET}$ of the actual torque TQ and the loss torque TQLOSSL when the valve lift L is low. Furthermore, the indicated torque $TQI_L$ when the valve lift L is low is determined by establishing the difference between the net value TQ_NET of the actual torque TQ and the loss torque $TQ\_LOSS_H$ when the valve lift H is high.

In a step S30, the ignition angle efficiency $EFF\_IGA_H$ is then determined for the cylinders whose valve lift VL has a high valve lift H. This is effected depending on the relationship specified in step S30.

In a step S32, the ignition angle efficiency $EFF\_IGA_L$ is then determined for the cylinders whose valve lift VL has a low valve lift L. This is effected depending on the relationship specified in step S32

In a step S34, the indicated torque TQI is determined as a function of the net value TQ_NET of the actual torque TQ and as a function of an average loss torque per working cycle of the internal combustion engine, which average loss torque is determined as a function of the loss torques $TQ\_LOSS_H$, $TQ\_LOSS_L$ with a high valve lift H and a low valve lift L. Following step S34, processing is then continued in step S10.

The invention claimed is:

1. A method for controlling an internal combustion engine having a plurality of cylinders, each cylinder having an associated combustion chamber and a spark plug that ignites a mixture of an air supply and a fuel, comprising:
   providing a plurality of adjusting devices that adjust the air supply of different combustion chambers of the engine;
   associating a decisive loss torque with a respective cylinder that is undergoing an intake cycle of a working cycle of the engine; and
   determining an individual ignition angle for a plurality of groups of the cylinders that a same air mass per working cycle is supplied,
   wherein the individual ignition angle is determined as a function of the decisive loss torque for the respective group.

2. The method according to claim 1, wherein the determination for the individual ignition angle for each group further includes a second decisive loss torque for a second group.

3. The method according to claim 1, wherein the individual ignition angle is limited to a minimum or a maximum ignition angle.

4. The method according to claim 1, wherein the individual ignition angle is limited to a minimum and a maximum ignition angle.

5. The method according to claim 3, further comprising determining a second ignition angle associated with a second group as a function of the minimum ignition angle when a first ignition angle associated with a first group reaches the minimum ignition angle.

6. The method according to claim 3, further comprising determining a second ignition angle associated with a second group as a function of the maximum ignition angle when a first ignition angle associated with a first group reaches the maximum ignition angle.

7. A system for controlling an internal combustion engine having a plurality of cylinders, each cylinder having an associated combustion chamber and a spark plug that ignites a mixture of an air supply and a fuel, comprising:
    a plurality of adjusting devices that adjust the air supply of different combustion chambers of the engine; and
    a control unit that:
        determines an individual ignition angle for each of a plurality of groups of cylinders to which the same air mass per working cycle is to be supplied and during the respective working cycles of which the same loss torque is decisive,
        wherein the decisive loss torque is the one associated with the respective cylinder that is in its intake cycle during the respective working cycle of the respective cylinder of the respective group and determines the individual ignition angle for each group as a function of the decisive loss torque for the respective group.

8. A method for controlling an internal combustion engine having a plurality of cylinders, each cylinder having an associated combustion chamber and a spark plug that ignites a mixture of an air supply and a fuel and a plurality of adjusting devices that adjust the air supply of different combustion chambers of the engine, comprising:
    supplying a same air mass per working cycle respectively to a plurality of groups of cylinders; and
    determining an individual ignition angle for each of the plurality of groups of the cylinders supplied the same air mass per working cycle and during the respective working cycles of which the same loss torque is decisive,
    wherein the decisive loss torque is the one associated with the respective cylinder that is in its intake cycle during the respective working cycle of the respective cylinder of the respective group, wherein the individual ignition angle for each group is determined as a function of the decisive loss torque for the respective group.

9. The method according to claim 8, wherein the individual ignition angle for each group is determined as a function of a difference between the decisive loss torque for the respective group and a second decisive loss torque for another group.

10. The method according to claim 8, wherein the individual ignition angle is limited to a minimum or maximum ignition angle.

11. The method according to claim 8, wherein the individual ignition angle is limited to a minimum and maximum ignition angle.

12. The method according to claim 10, further comprising determining a second ignition angle associated with a second group as a function of the minimum ignition angle when a first ignition angle associated with a first group reaches the minimum ignition angle.

13. The method according to claim 10, further comprising determining a second ignition angle associated with a second group as a function of the maximum ignition angle when a first ignition angle associated with a first group reaches the maximum ignition angle.

* * * * *